United States Patent
Zhang

(10) Patent No.: US 8,033,104 B2
(45) Date of Patent: Oct. 11, 2011

(54) SELECTIVE CATALYTIC REDUCTION (SCR) CATALYST INJECTION SYSTEMS

(75) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 661 days.

(21) Appl. No.: 12/169,740

(22) Filed: Jul. 9, 2008

(65) Prior Publication Data

US 2010/0005790 A1     Jan. 14, 2010

(51) Int. Cl.
*F01N 3/10* (2006.01)

(52) U.S. Cl. .............................. 60/295; 60/303; 60/317

(58) Field of Classification Search ................ 60/286, 60/295, 310, 317, 303, 319
See application file for complete search history.

(56) References Cited

U.S. PATENT DOCUMENTS

| | | | |
|---|---|---|---|
| 7,104,359 B1 * | 9/2006 | Zelinski | 181/264 |
| 2003/0110763 A1 * | 6/2003 | Pawson et al. | 60/286 |
| 2007/0169467 A1 * | 7/2007 | Shirai et al. | 60/286 |
| 2008/0223022 A1 * | 9/2008 | Amon et al. | 60/299 |

FOREIGN PATENT DOCUMENTS

WO   WO 2005073526 A1 * 8/2005
WO   WO 2007036347 A1 * 4/2007
\* cited by examiner

*Primary Examiner* — Thomas Denion
*Assistant Examiner* — Jonathan Matthias

(57) ABSTRACT

A Selective Catalytic Reduction (SCR) injection system for mixing reductant with exhaust gasses. The system includes a plate disposed between walls of an entrance portion and an egress section of the exhaust pipe. The plate intercepts exhaust gasses entering the entrance section of the exhaust pipe and directs such exhaust gasses through apertures in a wall of a reductant-introducing conduit. The conduit has an outlet disposed in the egress section of the exhaust pipe. The wherein dimensions of the apertures in the wall and dimensions in the outlet of the conduit being selected to increase the velocity of the exhaust leaving the outlet of the conduit into the egress section of the exhaust pipe relative to the velocity of the exhaust gases in the entrance section.

6 Claims, 8 Drawing Sheets

SELECTIVE CATALYTIC REDUCTION (SCR) CATALYST INJECTION SYSTEMS

TECHNICAL FIELD

This invention relates generally to selective catalytic reduction (SCR) injection systems, and more particularly to systems for mixing reductant with exhaust gasses in such systems.

BACKGROUND AND SUMMARY

As is known in the art, current emission control regulations necessitate the use of catalysts in the exhaust systems of automotive vehicles in order to convert carbon monoxide (CO), hydrocarbons (HC), and nitrogen oxides (NOx) produced during engine operation into harmless exhaust gasses. Vehicles equipped with diesel or lean gasoline engines offer the benefits of increased fuel economy. Such vehicles have to be equipped with lean exhaust aftertreatment devices such as, for example, a reductant such as urea, in a urea-based Selective Catalytic Reduction (SCR) catalyst, which is capable of continuously reducing NOx emissions, even in an oxygen rich environment. Urea-based SCR catalysts use gaseous ammonia as the active NOx reducing agent. Typically, an aqueous solution of urea is carried on board of a vehicle, and an injection system is used to supply it into the exhaust gas stream. The heat in the exhaust gas causes the aqueous urea solution to decompose into ammonia and hydro-cyanic acid (HNCO). These decomposition products enter the SCR where the gas phase ammonia is adsorbed and the cyanic acid is further decomposed on the SCR to gas phase ammonia. The adsorbed ammonia then takes part in the reduction of gas phase $NO_x$. Selective Catalyst Reduction (SCR) system is proved to be reliable device for NOx reduction; however, the disadvantage of this system is that the overall performance is dependent of urea injection system. Water-urea solution is injected into exhaust stream, as shown in FIG. 1, and decomposes into NH3 and CO2 when heated up by exhaust gas. Certain length of pipe is needed to achieve an ideal mixing of NH3 in front of substrate; however it is usually not the case with stringent package constrain. In general, a flow mixer or atomizer is implemented right after the urea injector. It is very difficult to evaluate the performance of those flow-mixing devices experimentally.

The basic chemical reactions inside NOx reduction process by using urea solution are well known. Urea solution will atomize and dissolve as ammonia and carbon dioxide when mixes with exhaust gas of certain temperature as described by following equations:

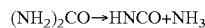
$(NH_2)_2CO \rightarrow HNCO+NH_3$

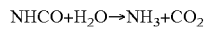
$NHCO+H_2O \rightarrow NH_3+CO_2$

Then gaseous ammonia reacts with NOx to produce Nitrogen and water as described as following:

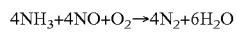
$4NH_3+4NO+O_2 \rightarrow 4N_2+6H_2O$

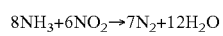
$8NH_3+6NO_2 \rightarrow 7N_2+12H_2O$

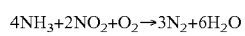
$4NH_3+2NO_2+O_2 \rightarrow 3N_2+6H_2O$

In the past, many flow mixers were developed for above purpose. Almost all the design attentions were focused on changing flow pattern by generating turbulent and swirling flow at the downstream of liquid spray.

The inventor has recognized that in order to achieve a significant improvement of flow mixing performance, besides two intrinsic flow mechanisms: turbulence and bulk rotation, another most important flow mechanism which can improve fluid atomization, evaporation and flow mixing greatly is direct flow impingement.

In accordance with the invention, a selective catalytic reduction (SCR) injection system is provided for mixing reductant with exhaust gasses. The system includes: a plate disposed between walls of an entrance portion of an exhaust pipe, such plate separating such entrance section of the exhaust pipe from an egress section of the exhaust pipe; and a reductant-introducing conduit. The exhaust gasses in the entrance section of the exhaust pipe pass through apertures in a wall of the reductant-introducing conduit. The conduit has an outlet disposed in the egress section of the exhaust pipe.

In one embodiment, a selective catalytic reduction (SCR) injection system is provided for mixing reductant with exhaust gasses. The system includes a plate disposed between walls of an exhaust pipe separating an entrance section of the exhaust pipe from an egress section of the exhaust pipe. The plate intercepts exhaust gasses entering the entrance section of the exhaust pipe and directs such exhaust gasses through apertures in a wall of a reductant-introducing conduit. The conduit has an outlet disposed in the egress section of the exhaust pipe.

With such an arrangement the system: increases flow impingement: help for droplet atomization and evaporation; increases turbulent intensity; help for evaporation and flow mixing; and increase bulk rotation help flow mixing.

In one embodiment, the dimensions of the apertures in the wall and dimensions in the outlet of the conduit are selected to increase the velocity of the exhaust gases leaving the outlet of the conduit into the egress section relative to the velocity of the exhaust gases in the entrance section of the exhaust pipe.

In one embodiment, the conduit is a perforated conduit and the plate is a "Z" shaped plate, such plate having a hole therein for receiving the conduit outlet.

In one embodiment, the outlet of the conduit is at lower portion thereof and the upper portion thereof is adapted to receive reductant.

In one embodiment, the plate has perforations passing portions of the exhaust gases in the entrance section of the exhaust pipe into the egress section of the exhaust pipe to reduce pressure in the entrance section of the exhaust pipe.

In one embodiment, the plate has perforations passing portions of the exhaust gases in the entrance section of the exhaust pipe into the egress section of the exhaust pipe to assist in creating a second impingement between exhaust gas and flows existing from injection conduit outlet and wherein first impingement occurring between exhaust gas entering the conduit through the apertures and reluctant in the conduit.

In one embodiment, the plate has perforations in an upper portion of the plate between the conduit and an upper wall portion of the exhaust pipe to assist in creating a second impingement between exhaust gas and flows existing from injection conduit outlet to reduce pressure in the entrance section of the exhaust pipe.

In one embodiment, the plate has perforations in a lower portion of the plate between the conduit and a lower wall portion of the exhaust pipe to assist in creating a second impingement between exhaust gas and flows existing from injection conduit outlet and to reduce pressure in the entrance section of the exhaust pipe.

In one embodiment, the plate has perforations in a lower portion of the plate between the conduit and a lower wall portion of the exhaust pipe to assist in creating a second impingement between exhaust gas and flows existing from injection conduit outlet and also in an upper portion of the plate between the conduit and an upper wall portion of the exhaust pipe to assist in creating a second impingement between exhaust gas and flows existing from injection conduit outlet and to reduce pressure in the entrance section of the exhaust pipe.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
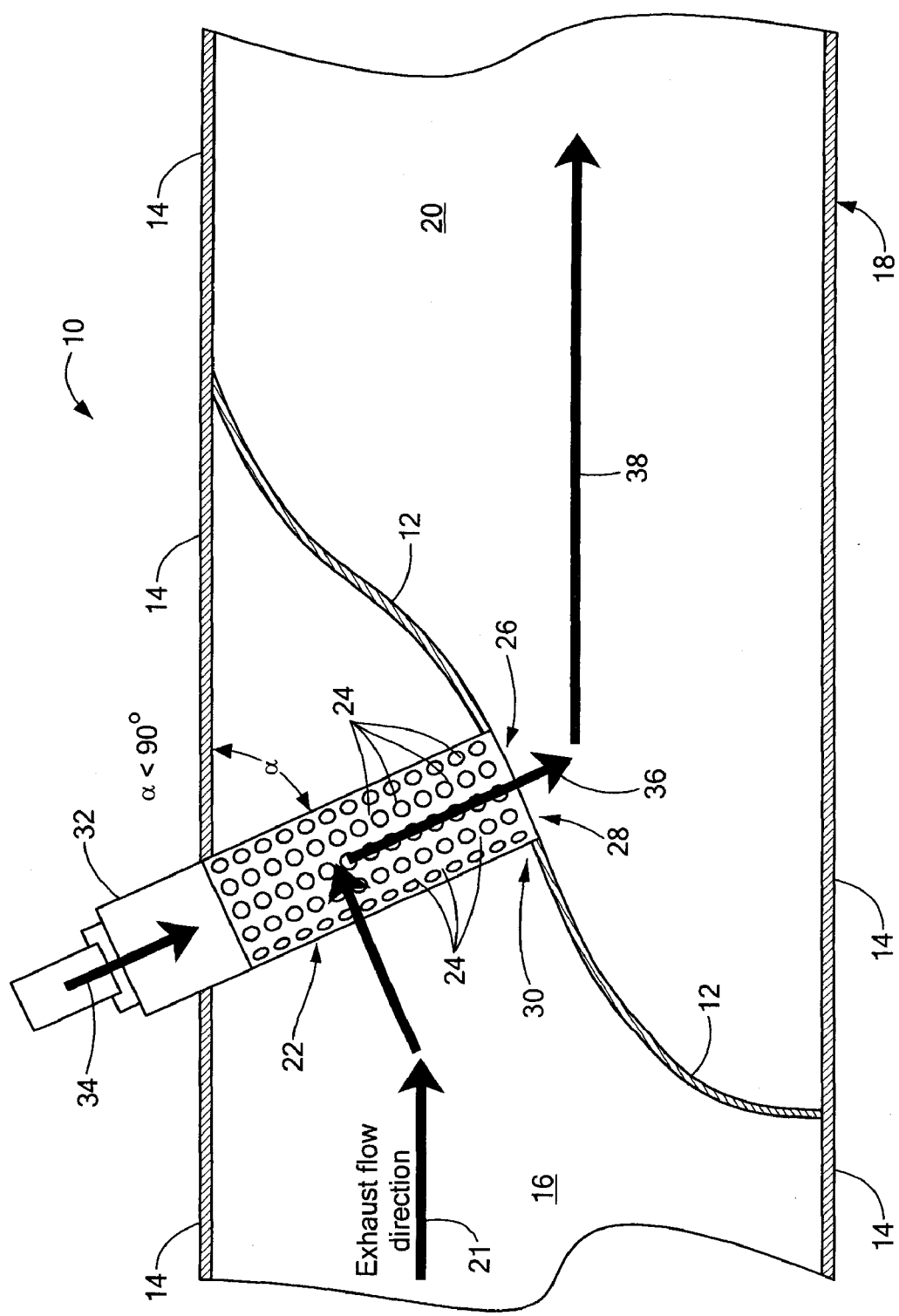
FIG. 1 is a cross sectional sketch of a selective catalytic reduction (SCR) injection system according to the invention.
Figure 2:
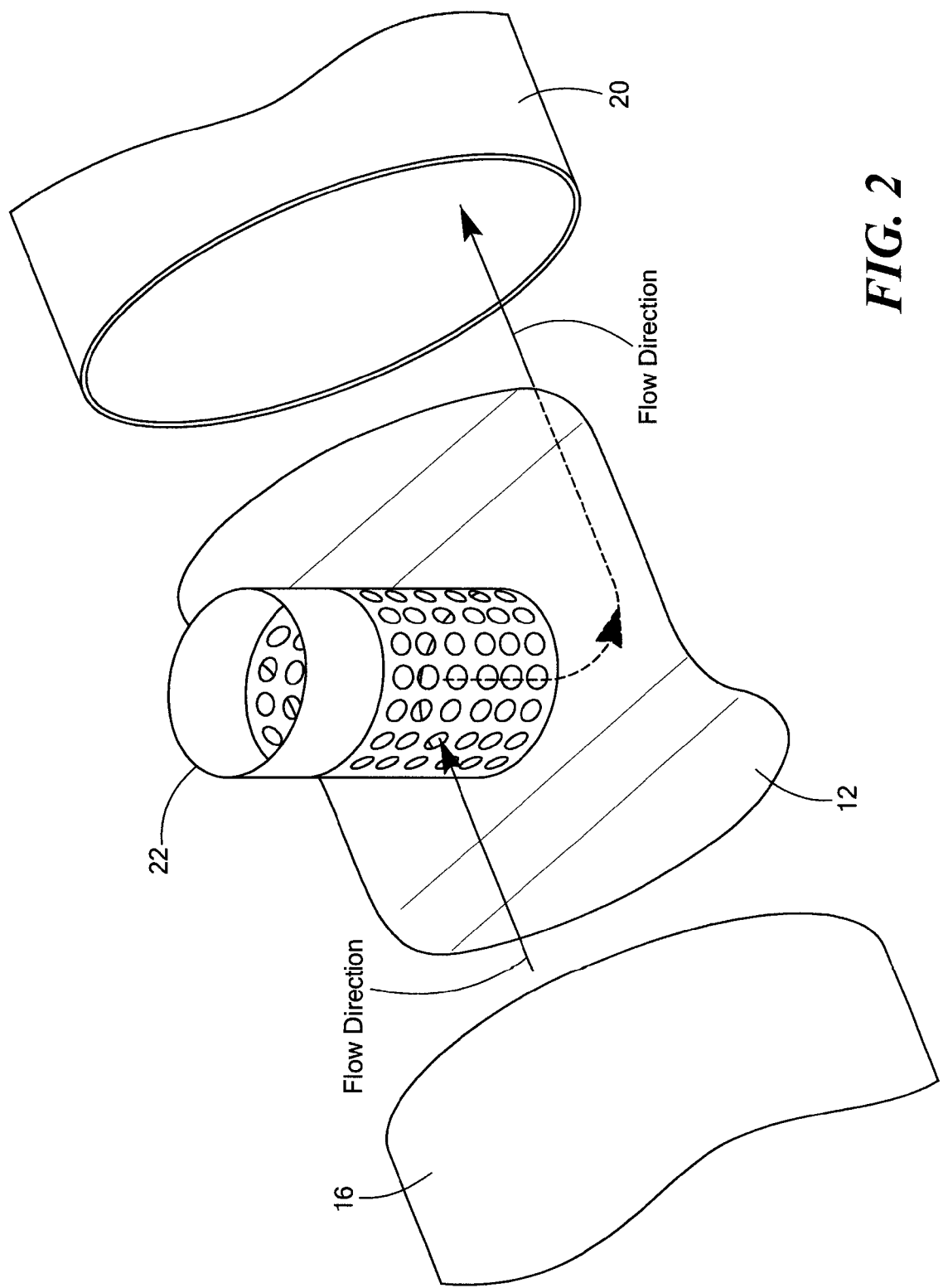
FIG. 2 is a prospective sectional sketch of the selective catalytic reduction (SCR) injection system of FIG. 1.

Referring now to FIGS. 1 and 2, a selective catalytic reduction (SCR) injection system 10 for mixing reductant with exhaust gasses is shown. The system 10 includes: a plate 12 disposed between walls 14 of an entrance section 16 of an exhaust pipe 18, such plate 12 separating such entrance section 16 of the exhaust pipe 18 from an egress section 20 of the exhaust pipe 18; and a reductant-introducing conduit 22. The plate 12 intercepts exhaust gasses, indicated by arrow 21, in the entrance section 16 of the exhaust pipe 18 and directs such exhaust gasses through apertures 24 in a wall of the reductant-introducing conduit 22. The conduit 22 has an outlet 26 disposed in a hole 28 of the plate 12 to pass flow in the conduit 22 into the egress section 20 of the exhaust pipe 18. The conduit 22 is disposed at an acute angle, α, with respect to the direction of exhaust gas flow in the entrance section of the exhaust pipe. The outlet 26 of the conduit 22 is at lower portion 30 thereof and the upper portion 32 thereof is adapted to receive reductant, such as for example, urea, indicated by arrow 34. The mixed flows, indicated by arrow 36, then exit the outlet 26 and pass into the egress section 20 of the exhaust pipe 18.

The dimensions of the apertures 24 in the wall and dimensions in the outlet 26 of the conduit 22 are selected to increase the velocity of the exhaust 38 leaving the outlet 26 of the conduit into the egress section 20 of the exhaust pipe relative to the velocity of the exhaust gases 21 in the entrance section. Further, the apertures 24 are arranged in an asymmetrical pattern on opposite sides of a plane, such plane being defined by a first line along the longitudinal axis of the exhaust pipe 18 and a second line disposed along the longitudinal axis of the conduit 22. This asymmetrical arrangement of apertures 24 generates swirl within the conduit 22. Such swirling flow generates large scale turbulence which significantly improves spray atomization and liquid droplet evaporation. The swirl effects may be analyzed using computational fluid dynamics analysis or flow test analysis.

Thus, the conduit 22 is a perforated conduit and the plate 12 is a "Z" shaped plate, such plate 12 having the hole 28 for receiving the conduit outlet 26.

Figure 3:
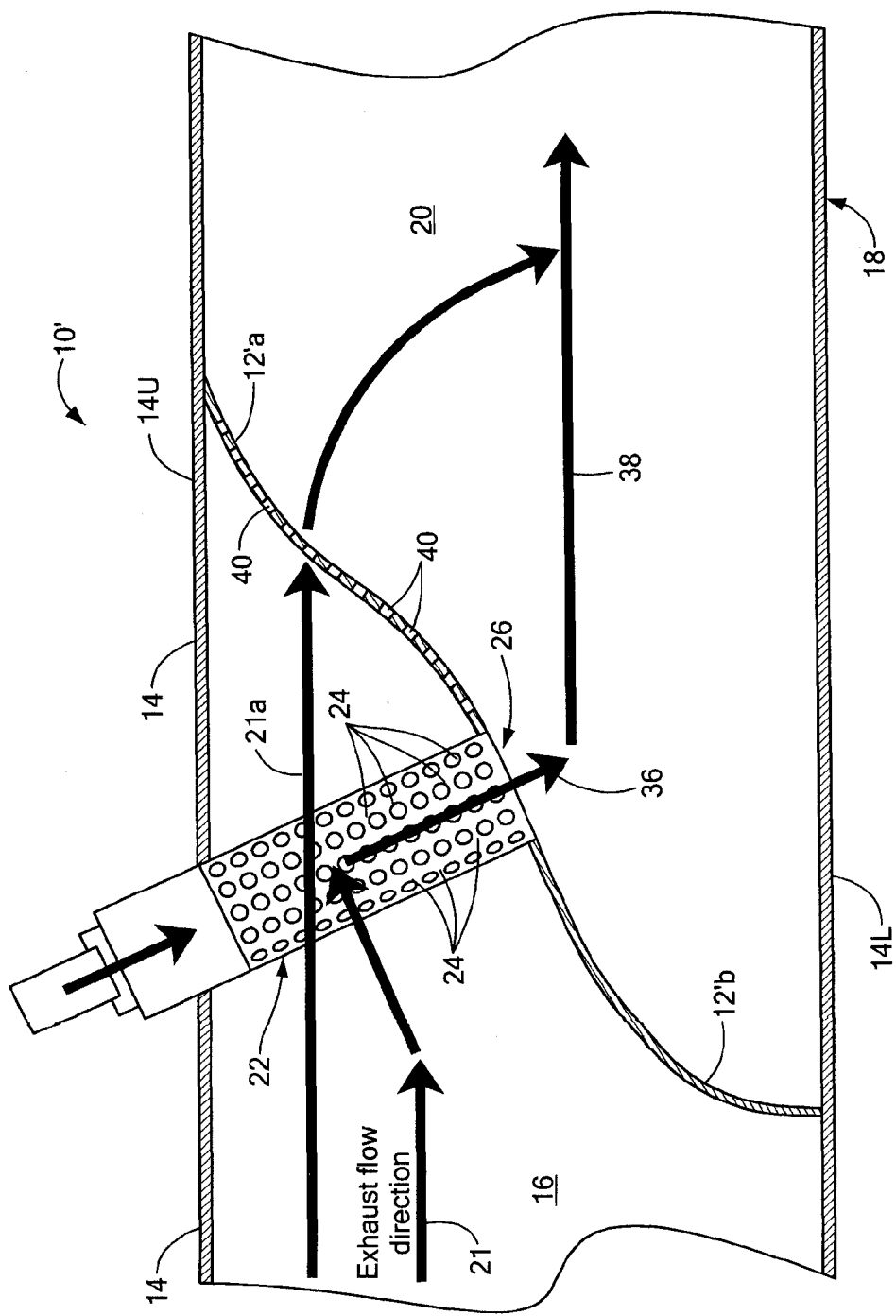
FIG. 3 is a cross sectional sketch of a selective catalytic reduction (SCR) injection system according to another embodiment of the invention.

Referring now to FIG. 3, another embodiment is shown. Here, the plate 12 of FIG. 1 has perforations 40 passing portions 21a of the exhaust gases 21 in the entrance section 16 into the egress section 20 of the exhaust pipe 18 to reduce pressure in the entrance section 16 of the exhaust pipe 18. Here, in this embodiment, the plate 12' has perforations in an upper portion 12'a of the plate 12' between the conduit 22 and an upper wall portion 14U of the exhaust pipe 18 to assist in creating a second impingement between exhaust gas 21a and flows 36 existing from injection conduit outlet 26.

Figure 4:
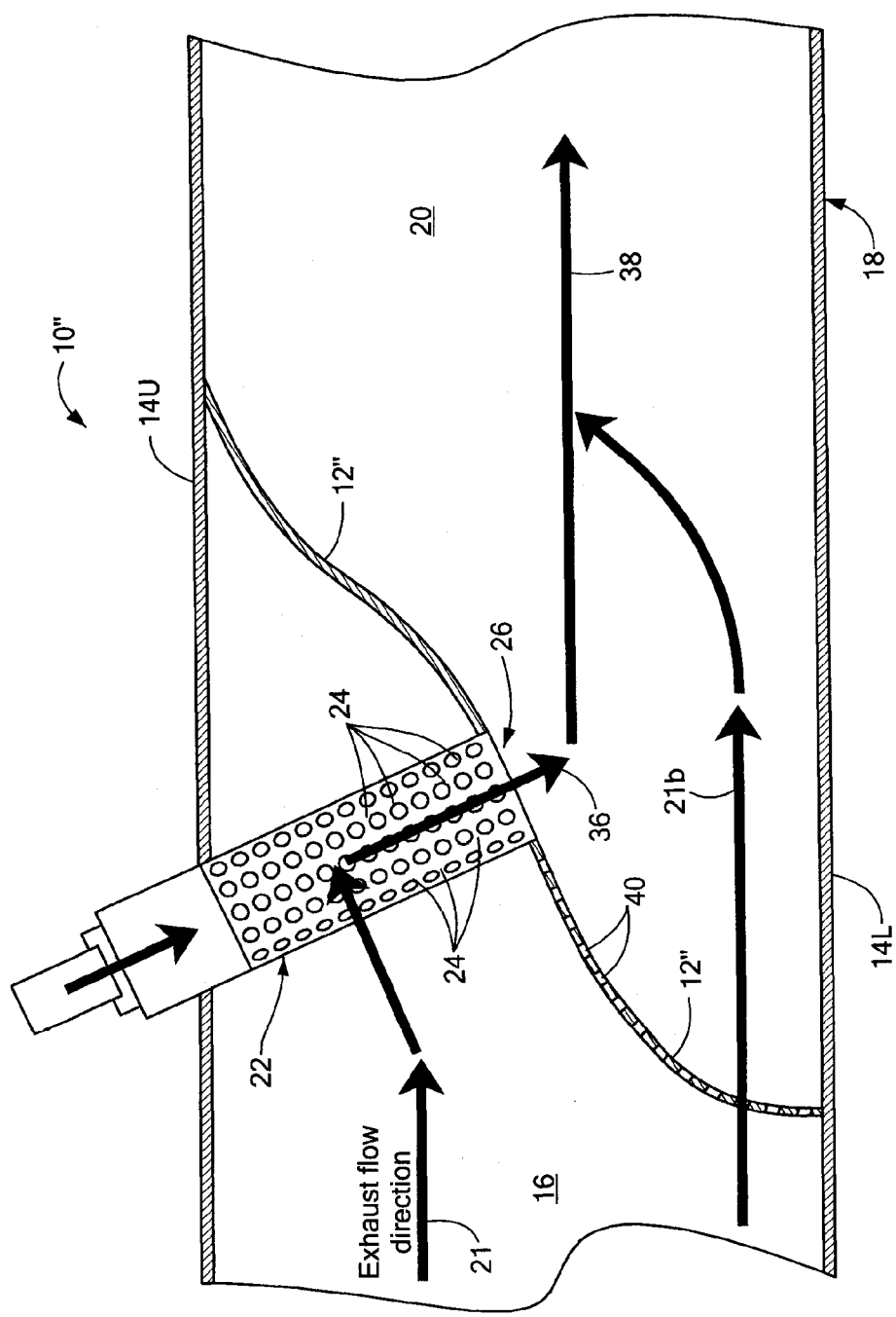
FIG. 4 is a cross sectional sketch of a selective catalytic reduction (SCR) injection system according to another embodiment of the invention.

Referring now to FIG. 4, another embodiment is shown. Here, in this embodiment, the plate 12' of system 12" has perforations in a lower portion of the plate 12" between the conduit 22 and a lower wall portion 14L of the exhaust pipe 18 to assist in creating a second impingement between exhaust gas 21b and flows 36 existing from injection conduit outlet 26.

Figure 5:
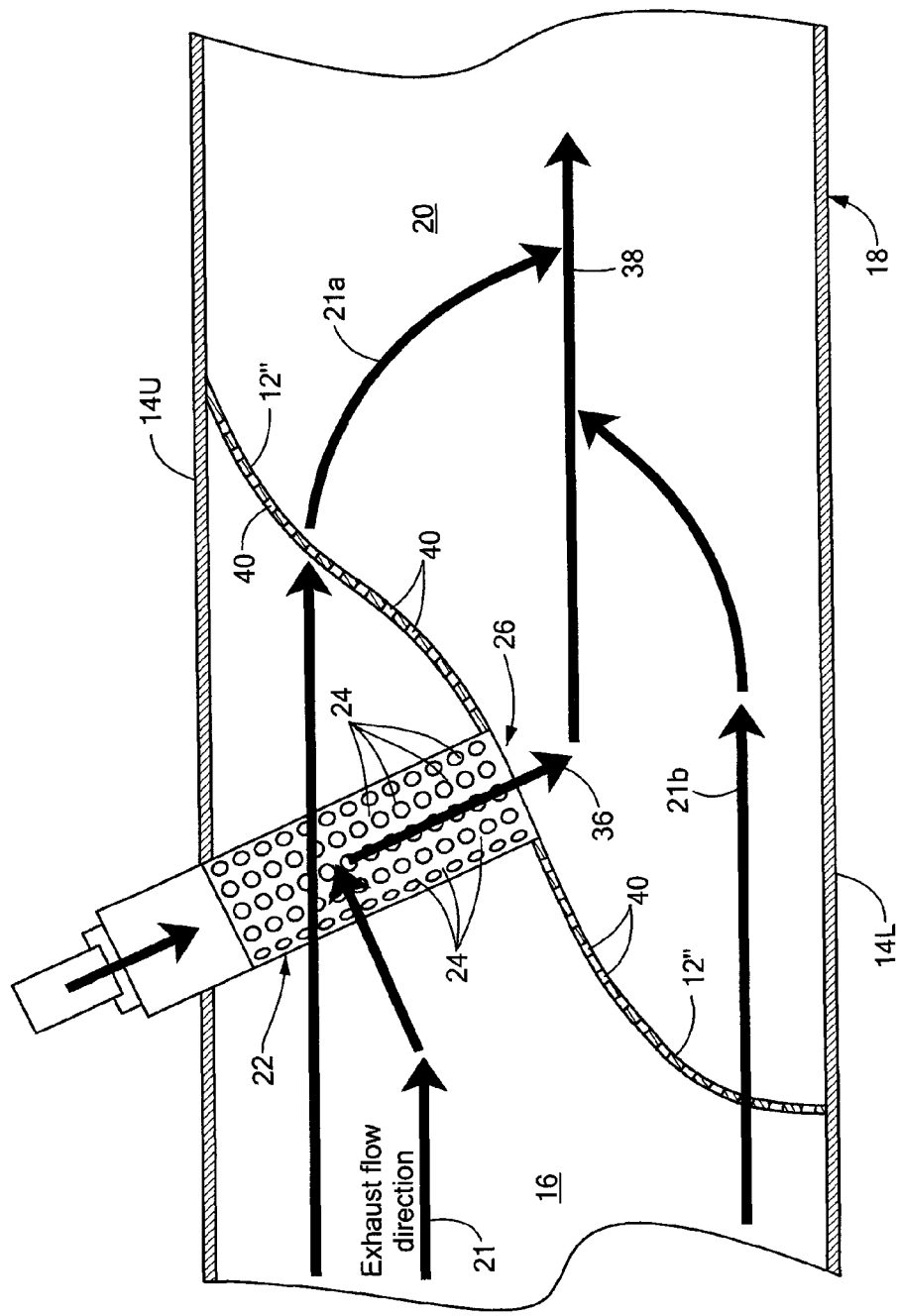
FIG. 5 is a cross sectional sketch of a selective catalytic reduction (SCR) injection system according to another embodiment of the invention.
Figure 6:
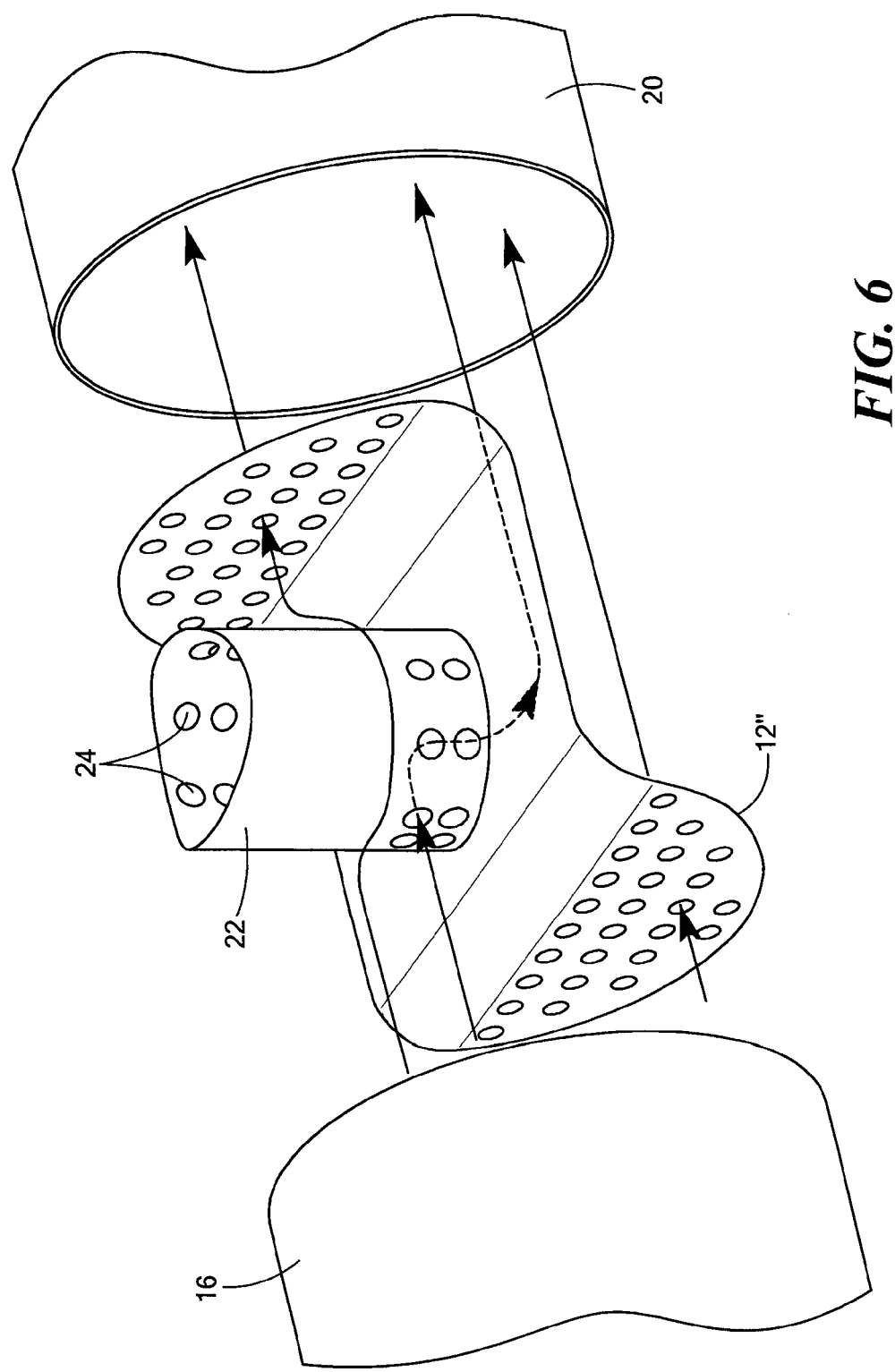
FIG. 6 is a prospective sectional sketch of the selective catalytic reduction (SCR) injection system of FIG. 5.

Referring now to FIGS. 5 and 6, the plate 12" has perforations 40 in both the lower portion of the plate between the conduit 22 and a lower wall portion 14L of the exhaust pipe to assist in creating a second impingement between exhaust gas and flows existing from injection conduit outlet 26 and also in an upper portion of the plate 12" between the conduit 22 and an upper wall portion 14U of the exhaust pipe to assist in creating a third impingement between exhaust gas and flows existing from injection conduit outlet and to reduce pressure in the entrance section of the exhaust pipe.

Figure 7:
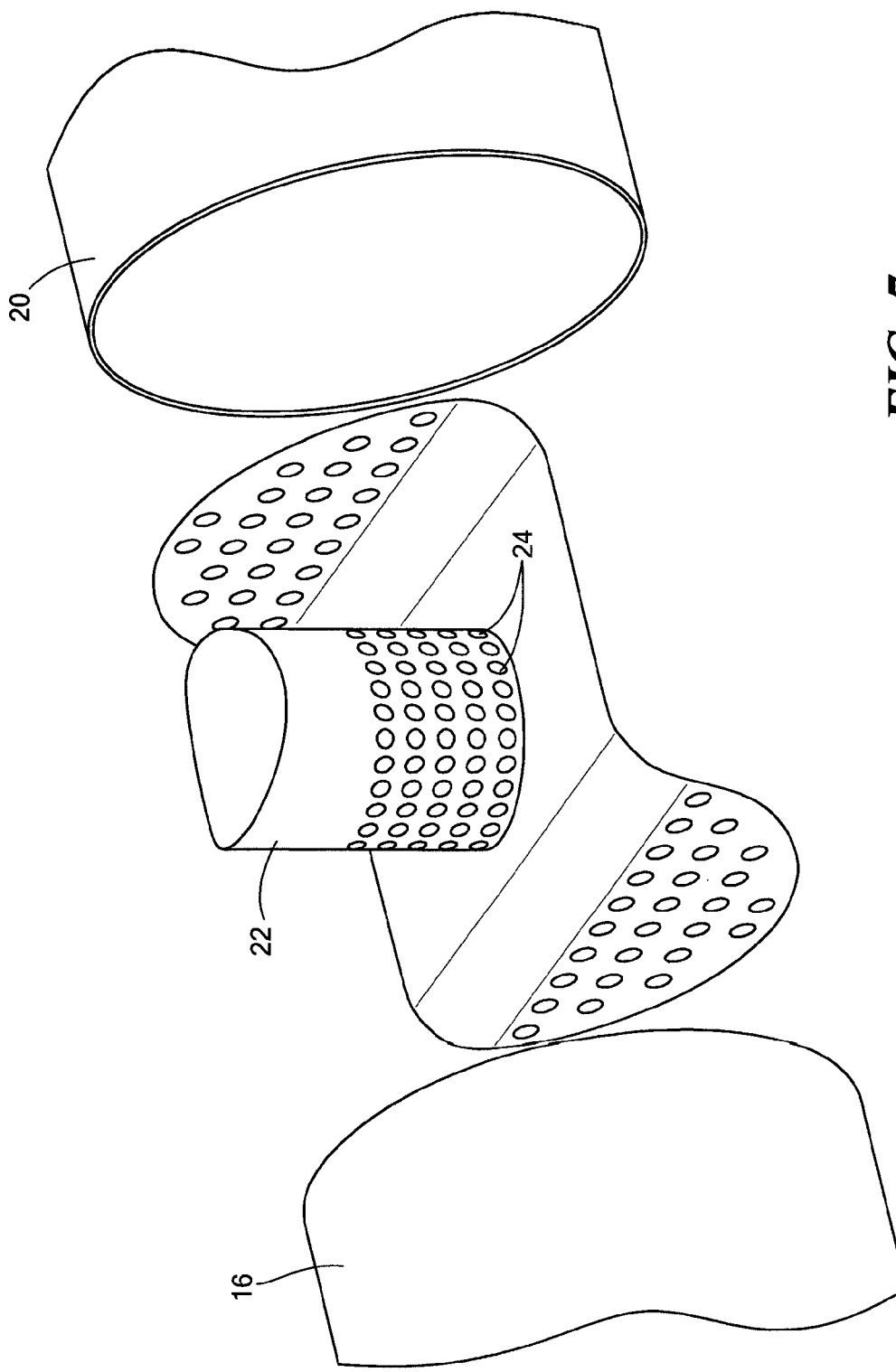
FIG. 7 is a prospective sectional sketch of the selective catalytic reduction (SCR) injection system of FIG. 5 according to another embodiment of the intention.
Figure 8:
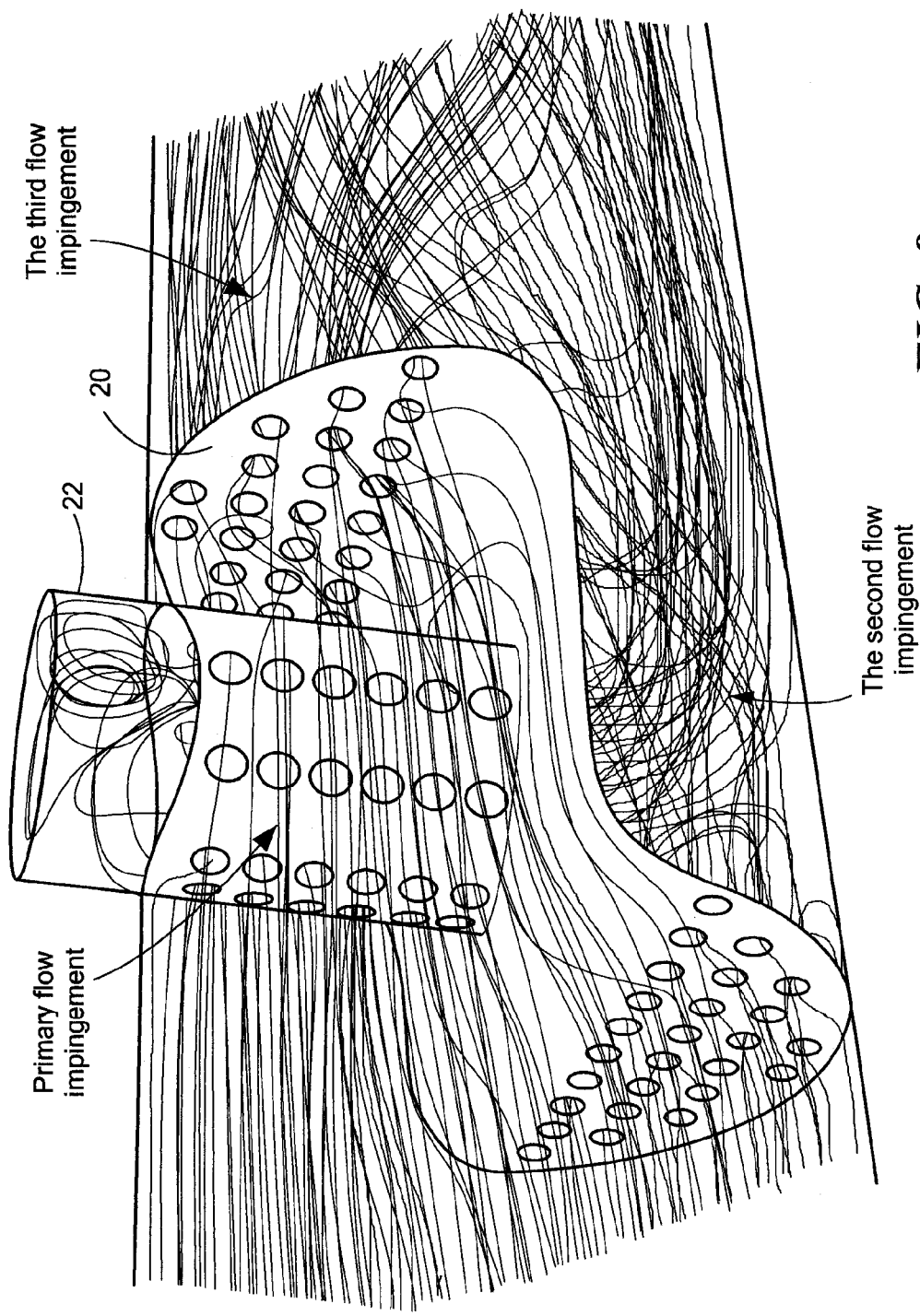
FIG. 8 is a prospective sectional sketch of the selective catalytic reduction (SCR) injection system of FIG. 5 showing gas flows through such system.

Referring to FIG. 7 a prospective sectional sketch of the selective catalytic reduction (SCR) injection system of FIG. 5 according to another embodiment of the intention is shown. Here, the positions of the apertures 24 in the conduct 22 have been changed from that shown in FIG. 6. FIG. 8 is a prospective sectional sketch of the selective catalytic reduction (SCR) injection system of FIG. 5 showing gas flows through such system.

A number of embodiments of the invention have been described. Nevertheless, it will be understood that various modifications may be made without departing from the spirit and scope of the invention. Accordingly, other embodiments are within the scope of the following claims.

What is claimed is:

1. A selective catalytic reduction (SCR) injection system for mixing reductant with exhaust gasses, comprising:
   a plate disposed between walls of an entrance portion of an exhaust pipe, such plate separating such entrance section of the exhaust pipe from an egress section of the exhaust pipe;
   a reductant-introducing conduit having perforations in sidewalls thereof and having an outlet disposed in the egress section of the exhaust pipe; and
   wherein:
   the plate has perforations in a portion of the plate between the reductant-introducing conduit and a inner wall portion of the exhaust pipe; and
   wherein a first portion of exhaust gasses in the entrance section of the exhaust pipe pass through the perforations in the sidewalls of the reductant-introducing conduit into the reductant-introducing conduit and then exit the outlet of the reductant-introducing conduit into the egress section of the exhaust pipe; and wherein a second portions of the exhaust gasses in the entrance section of the exhaust pipe pass through the perforations in the plate and enter into the egress section of the exhaust pipe.

2. The injection system recited in claim 1 wherein dimensions of the apertures in the wall and dimensions in the outlet of the conduit being selected to increase the velocity of the exhaust leaving the outlet of the conduit into the egress section of the exhaust pipe relative to the velocity of the exhaust gases in the entrance section.

3. The selective catalytic reduction (SCR) injection system recited in claim 1 wherein the conduit is a perforated conduit and the plate is a "Z" shaped plate, such plate having a hole for receiving the conduit outlet.

4. The selective catalytic reduction (SCR) injection system recited in claim 1 wherein an upper portion of the perforated conduit is adapted to receive reductant.

5. The selective catalytic reduction (SCR) injection system recited in claim 1 wherein the plate has second perforations in a second portion of the plate between the conduit and a second inner wall portion of the exhaust pipe wherein a third portions of the exhaust gasses in the entrance section of the exhaust pipe pass through the second perforations in the plate and enter into the egress section of the exhaust pipe.

6. The selective catalytic reduction (SCR) injection system recited in claim 1 wherein the conduit is disposed at an acute angle with respect to the direction of exhaust gas flow in the entrance section of the exhaust pipe.

* * * * *